United States Patent
Jouy et al.

(10) Patent No.: US 11,686,215 B2
(45) Date of Patent: Jun. 27, 2023

(54) ASSEMBLY FOR TURBINE

(71) Applicant: SAFRAN AIRCRAFT ENGINES, Paris (FR)

(72) Inventors: Baptiste Marie Aubin Pierre Jouy, Paris (FR); Adrien Moussette, Paris (FR); Bertrand Guillaume Robin Pellaton, Boeil Bezing (FR); Loic Villard, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 423 days.

(21) Appl. No.: 15/741,545

(22) PCT Filed: Jul. 5, 2016

(86) PCT No.: PCT/FR2016/051700
§ 371 (c)(1),
(2) Date: Jan. 3, 2018

(87) PCT Pub. No.: WO2017/006045
PCT Pub. Date: Jan. 12, 2017

(65) Prior Publication Data
US 2018/0195411 A1 Jul. 12, 2018

(30) Foreign Application Priority Data
Jul. 6, 2015 (FR) ...................... 15 56382

(51) Int. Cl.
*F01D 25/14* (2006.01)
*F01D 11/08* (2006.01)
(Continued)

(52) U.S. Cl.
CPC .............. *F01D 25/14* (2013.01); *F01D 11/08* (2013.01); *F01D 11/14* (2013.01); *F01D 25/12* (2013.01);
(Continued)

(58) Field of Classification Search
CPC .......... F01D 11/24; F01D 25/24; F01D 25/12; F01D 25/28
See application file for complete search history.

(56) References Cited

U.S. PATENT DOCUMENTS

2002/0062945 A1* 5/2002 Hocker .................. F01D 5/189
165/53
2012/0057969 A1 3/2012 Jiang et al.
(Continued)

FOREIGN PATENT DOCUMENTS

| EP | 0 905 353 A1 | 3/1999 |
| EP | 2 778 369 A1 | 9/2014 |
| WO | 2009/144191 A1 | 12/2009 |

OTHER PUBLICATIONS

International Search Report dated Oct. 27, 2016, in PCT/FR2016/051700 filed Jul. 5, 2016.
(Continued)

*Primary Examiner* — Topaz L. Elliott
*Assistant Examiner* — Cameron A Corday
(74) *Attorney, Agent, or Firm* — Oblon, McClelland, Maier & Neustadt, L.L.P.

(57) ABSTRACT

An assembly for a turbine of a turbine engine, including a casing and an annular duct surrounding the casing, which can be connected to a device for supplying cooling air, and having a radially inner annular wall provided with openings arranged opposite the casing in order to cool same by the impact of cooling-air jets. The casing has a plurality of axial grooves including first grooves and second grooves arranged in alternation, and the openings are distributed in a plurality of annular rows in which any pair of consecutive annular rows is such that the openings of one of the annular rows of the pair are centered relative to the first grooves while the
(Continued)

openings of the other annular row of the pair are centered relative to the second grooves.

9 Claims, 2 Drawing Sheets

(51) Int. Cl.
*F01D 11/14* (2006.01)
*F01D 25/12* (2006.01)

(52) U.S. Cl.
CPC .... *F05D 2210/12* (2013.01); *F05D 2220/323* (2013.01); *F05D 2240/11* (2013.01); *F05D 2240/24* (2013.01); *F05D 2260/201* (2013.01); *Y02T 50/60* (2013.01)

(56) References Cited

U.S. PATENT DOCUMENTS

| | | | |
|---|---|---|---|
| 2013/0028705 A1* | 1/2013 | Lagueux | F01D 11/24 415/1 |
| 2013/0156541 A1 | 6/2013 | Eleftheriou et al. | |
| 2014/0238028 A1 | 8/2014 | Yamane et al. | |

OTHER PUBLICATIONS

Preliminary French Search Report dated Apr. 26, 2016, in FR 1556382 filed Jul. 6, 2015.

* cited by examiner

ASSEMBLY FOR TURBINE

TECHNICAL FIELD

This invention relates to the field of turbine engines, such as the engines of aircraft, and more particularly concerns the problem concerning cooling the casings of the turbines of turbine engines.

PRIOR ART

The performance levels of a turbine of a turbine engine depend on the capacity thereof to limit the gas flows bypassing the fixed and mobile vanings. More specifically, said gas flows, occasionally called "by-pass flows", do not contribute to the working of the turbine. In order to increase the yield of the turbine, the radial distances, called "radial clearances" between the fixed and mobile parts of the turbine must be reduced as much as possible.

For this purpose, means for controlling the radial clearances at the apex of the moving blades have in particular been developed. Such means generally take on the form of annular ducts that surround the casing of the turbine and along which flows cooling air sourced from another part of the turbine engine. Such annular ducts are provided with openings for injecting cooling air onto the outer surface of the casing in order to cool it and thus limit the thermal expansion thereof. In particular, the openings can advantageously have an air ejection axis that is substantially orthogonal to the casing in order to implement a technique commonly called "impingement cooling".

The international patent application WO2009144191 shows one example of a turbine equipped with such radial clearance control means.

Nonetheless, there is a need to improve the efficiency of such radial clearance control means.

One solution thereto can consist of increasing the number of openings intended for injecting cooling air on the casing.

However, this approach is limited by the minimum centreline distance imposed with regard to said openings, by the aforementioned annular duct manufacturing methods. By way of example, this centreline distance can be about 1.6 mm for some types of turbines.

In order to overcome this obstacle, the inventors of this invention have considered the use of annular ducts provided with a plurality of annular rows of circumferentially-offset openings, such that each opening of one of the annular rows is circumferentially situated halfway between two consecutive openings of a neighbouring annular row. More specifically, such a configuration allows the number of holes on a given surface area to be increased considerably, while complying with the minimum centreline distance imposed by the manufacturing methods.

However, according to the results of studies conducted by the inventors, the performance levels obtained with regard to the cooling of the casing are insufficient.

DESCRIPTION OF THE INVENTION

The purpose of the invention is in particular to provide an effective solution to this problem.

It therefore proposes an assembly for a turbine of a turbine engine, comprising a casing and at least one annular duct surrounding the casing, the annular duct being capable of being connected to means for supplying cooling air, and having a radially inner annular wall provided with openings arranged opposite an outer surface of the casing in order to cool said casing by the impact of cooling-air jets.

According to the invention, the casing has a plurality of axial grooves comprising first grooves and second grooves arranged in alternation.

Moreover, the openings are distributed in a plurality of annular rows in which any pair of consecutive annular rows is such that the openings of one of the annular rows of the pair are centred relative to the first grooves, while the openings of the other annular row of the pair are centred relative to the second grooves.

The inventors have demonstrated that the lack of efficacy of the configurations with offset openings, which were initially tested, is the result of interference between the jets originating from neighbouring openings belonging to different annular rows. Such interference appears to be detrimental to the thermal exchange coefficient between the air jets and the casing, and are thus detrimental to the cooling of said casing.

However, the invention allows said interference phenomena to be limited, or even entirely prevented, and thus considerably improves the cooling of the casing.

The grooves of the casing more specifically allow the air jets originating from the openings of the annular duct to be channelled, and thus encourage separation of the air jets originating from neighbouring openings belonging to different annular rows.

It should be noted that the term "casing" is understood herein as any type of enclosure externally delimiting the gas flow channel within the turbine.

Preferably, all axial grooves have the same shape.

Moreover, each first groove is advantageously adjacent to the two second grooves consecutive thereto.

There is therefore no space between the axial grooves.

In another preferred embodiment of the invention, each of the axial grooves extends continuously opposite a plurality of openings respectively belonging to a plurality of non-consecutive annular rows from among the aforementioned annular rows.

Preferably, the distance between the bottom of each of the axial grooves and the radially inner annular wall of the annular duct lies in the range of three to five times the depth of each of the axial grooves.

Preferably, the depth of each of the axial grooves is substantially equal to the diameter of the openings.

The invention further relates to a turbine for a turbine engine, comprising a rotor, in addition to an assembly of the type described above, the casing of which surrounds the rotor of the turbine.

Finally, the invention relates to a turbine engine for an aircraft, comprising at least one turbine of the type described above, in addition to means for supplying cooling air connected to said annular duct.

BRIEF DESCRIPTION OF THE FIGURES

The invention will be better understood, and other features, advantages and characteristics of the invention will appear upon reading the following description provided as a non-limiting example with reference to the accompanying figures, in which.

DETAILED DESCRIPTION OF A PREFERRED EMBODIMENT

Figure 1:
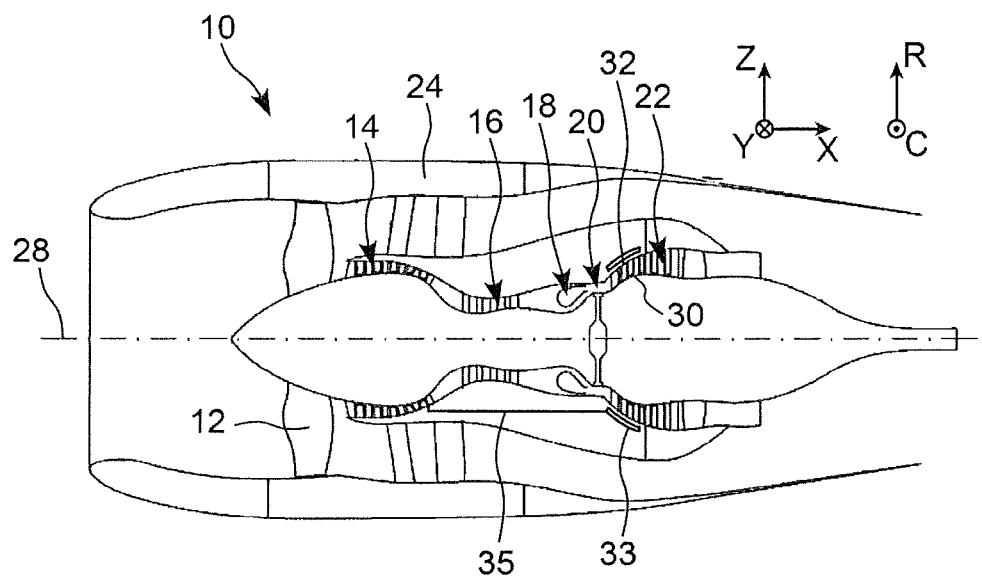
FIG. 1 is a diagrammatic, sectional view along an axial plane of a turbine engine for an aircraft according to one preferred embodiment of the invention.

FIG. 1 shows a turbine engine 10 for an aircraft, for example a dual-flow turbojet engine, comprising in a general manner a fan 12 intended to aspirate an air flow divided downstream of the fan into a primary flow supplying a core of the turbine engine and a secondary flow bypassing said core. The core of the turbine engine comprises, in a general manner, a low-pressure compressor 14, a high-pressure compressor 16, a combustion chamber 18, a high-pressure turbine 20 and a low-pressure turbine 22. The turbine engine is ducted by a nacelle 24 surrounding the flow space 26 of the secondary flow. The rotors of the turbine engine are mounted such that they rotate about a longitudinal axis 28 of said turbine engine.

In the following description, the X, Y and Z directions respectively constitute the longitudinal, transverse and vertical directions of the turbine engine. The longitudinal direction X is also called the "axial direction". The radial R and circumferential C directions are defined relative to the longitudinal axis 28.

In a known manner, the low-pressure turbine 22 comprises a rotor 30 comprising a plurality of discs mounted such that they rotate about the longitudinal axis 28 and provided with moving blades extending into the passage of the primary flow originating from the combustion chamber 18. The low-pressure turbine 22 further comprises annular rows of static blades positioned in an alternating manner with the discs of the rotor 30. Finally, the low-pressure turbine 22 comprises a casing 32 which surrounds the rotor 30, and means 33 for controlling the radial clearances at the apex of the moving blades. Said means for controlling the radial clearances 33 conventionally comprise one or more annular ducts 34 (FIG. 2), sometimes called "manifolds", extending around the casing 32, and connected to means 35 for supplying cooling air in order to allow for the circulation of a flow of cooling air sourced from another part of the turbine engine, for example from the flow space 26 of the secondary flow downstream of the fan 12. The casing 32 can directly delimit the flow space of the primary flow, or alternatively, said casing can be used to support an annular row of ring sectors mounted circumferentially end-to-end, opposite the radially inner surface of the casing, and delimiting the flow space of the primary flow.

Each annular duct 34 comprises a radially inner annular wall 36 extending opposite an outer surface 38 of the casing 32 and provided with openings 40 intended for injecting cooling air towards the casing 32, along an incidence that is substantially normal, in order to cool the casing 32 by impact.

Figure 2:
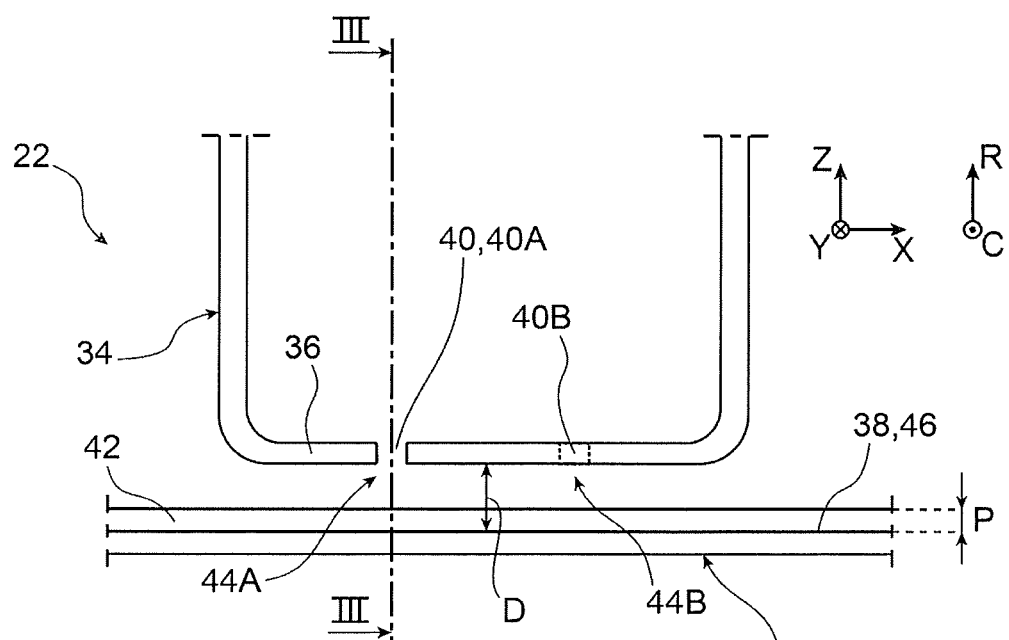
FIG. 2 is a diagrammatic, partial, sectional half-view along an axial plane of an assembly comprising a casing of a turbine of the turbine engine in FIG. 1, in addition to an annular duct surrounding said casing for injecting cooling air onto the casing.
Figure 3:
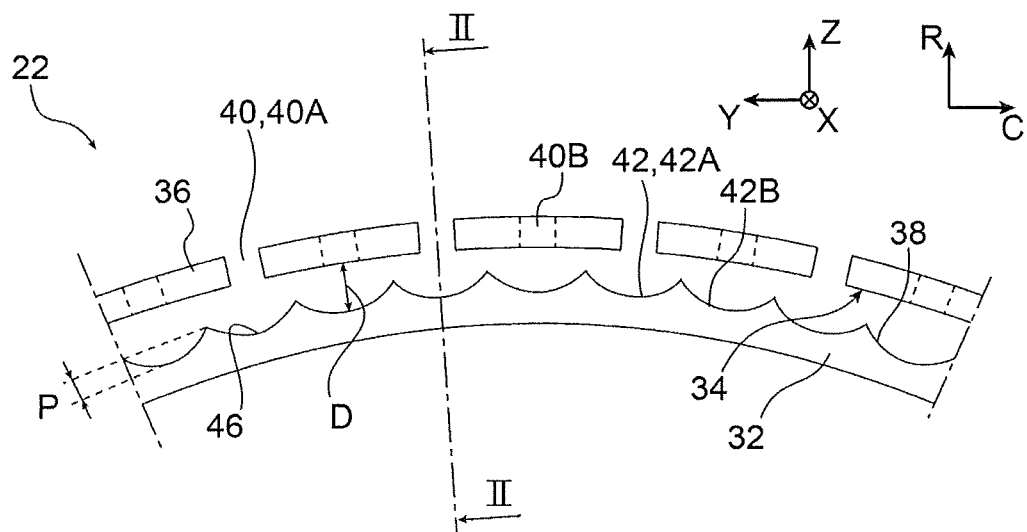
FIG. 3 is a diagrammatic, partial cross-sectional view of the assembly in FIG. 2.
Figure 4:
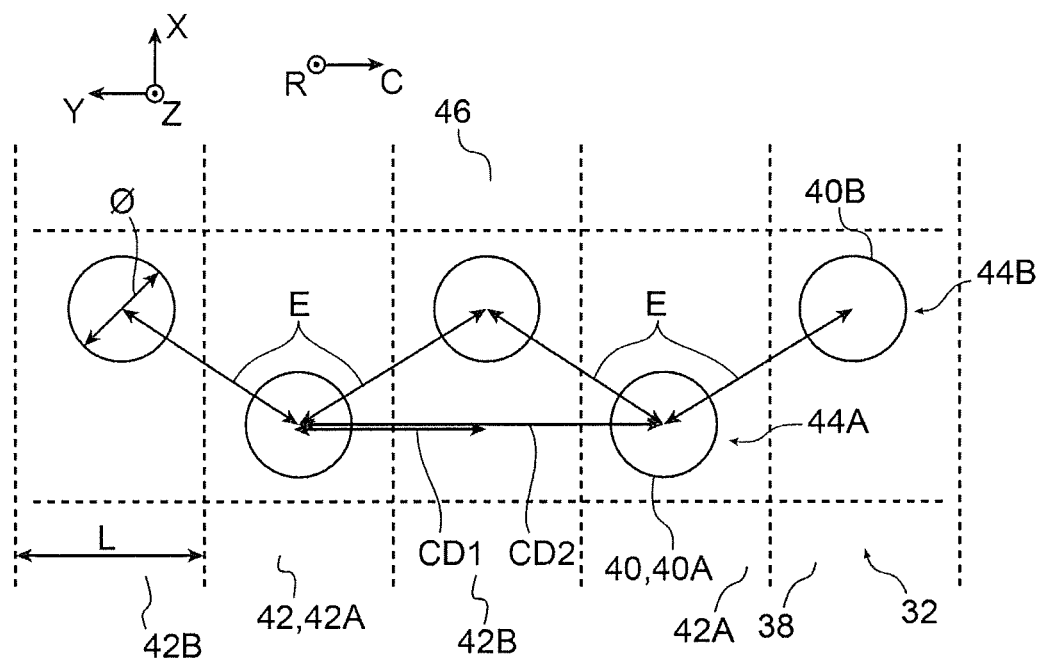
FIG. 4 is a diagrammatic, partial, expanded view along a plane of the casing of the assembly in FIG. 2, showing the orthogonal projection of openings of the annular duct of the assembly, intended for injecting cooling air onto the casing.

According to a feature of the invention, as shown in FIGS. 2 to 4, the casing 32 has a plurality of axial grooves 42. For the needs hereof, said axial grooves are considered to be formed by a circumferential alternation of first grooves 42A and second grooves 42B.

As shown more particularly in FIG. 4, which illustrates an orthogonal projection of openings 40 on the outer surface 38 of the casing 32 shown in an expanded view along a plane, the openings 40 are distributed into a plurality of annular rows 44A, 44B, for example two annular rows, and are arranged such that the openings 40A of one of the annular rows 44A are centred relative to the first grooves 42A, while the openings 40B of the other annular row 44B are centred relative to the second grooves 42B.

More generally, in the event that the number of annular rows of openings is greater than two, any pair of consecutive annular rows is such that the openings 40 of one of the annular rows of the pair are centred relative to the first grooves 42A, while the openings 40 of the other annular row of the pair are centred relative to the second grooves 42B.

Therefore, each opening 40 of one of the annular rows is circumferentially offset relative to the two consecutive openings of a neighbouring annular row situated the closest to the opening considered.

The number of openings 40 that can be arranged over a given surface area is thus increased compared to that of conventional annular ducts, while complying with the minimum centreline distance value E imposed, for example equal to 1.6 mm in the embodiment of the invention shown.

More specifically, each opening 40A, 40B thus opens out opposite an axial groove 42A, 42B that is different to the axial grooves 42B, 42A into which open the neighbouring openings 40B, 40A which belong to an annular row that is different to that of the opening considered.

The inventors have shown that the axial grooves 42 allow the cooling-air jets originating from the openings 40 to be channelled and thus prevent said jets from interfering with each other in a manner that is detrimental to the cooling of the casing 32.

In certain alternative embodiments of the invention, each axial groove 42 thus extends continuously opposite a plurality of openings 40 which respectively belong to a plurality of non-consecutive annular rows 44A or 44B.

It should be noted that the casing 32 and the one or more annular ducts 34 form an assembly for a turbine according to the terminology adopted herein.

In the example shown, all of the axial grooves have the same shape, and in particular the same width L in the circumferential direction.

Moreover, each first groove 42A is adjacent to the two second grooves 42B consecutive thereto. It goes without saying that this means that each second groove 42B is adjacent to the first two grooves 42A consecutive thereto.

As a result, each opening 40A, 40B of one of the annular rows 42A, 42B is situated at a circumferential distance CD1 equal to half of the circumferential distance CD2 that separates two consecutive openings 40B, 40A of a neighbouring annular row 42B, 42A situated the closest to the opening 40 considered.

In the example shown, the distance D between the bottom 46 of each of the axial grooves and the radially inner annular wall 36 of the annular duct lies in the range of three to five times the depth P of each of the axial grooves 42.

In this example, the distance D is equal to about 3 mm, whereas the depth P is equal to about 0.8 mm.

Moreover, the depth P of each of the axial grooves 42 is substantially equal to the diameter Ø of the openings 40.

Finally, the axial scope of the axial grooves 42 is determined according to the configuration of the casing 32 and the one or more annular ducts 34, and is preferably greater than 2.5 cm in the embodiment of the invention shown.

It should be noted that the principle of the invention, described hereinabove in the case of a low-pressure turbine of a turbojet engine, can be applied in a similar manner to a high-pressure turbine of a turbojet engine, or to a turbine of a turboprop engine or of a turbine engine having an unducted pair of propellers, also known as an "open rotor" engine, or more generally to any type of turbine in any type of turbine engine.

The invention claimed is:

1. An assembly for a turbine of a turbine engine, comprising:
   a casing; and
   an annular duct surrounding the casing and extending along an axial direction of the turbine engine, the annular duct being capable of being connected to means for supplying cooling air, and the annular duct having a radially inner annular wall provided with openings arranged opposite an outer surface of the casing in order to cool said casing by the impact of cooling-air jets,
   wherein the casing has a plurality of axial grooves extending in the axial direction and comprising first grooves and second grooves arranged in alternation in a circumferential direction, wherein each first groove is adjacent to the two second grooves consecutive thereto such that each of the first grooves has a circumferential end in common with a circumferential end of one of the second grooves,
   wherein the openings are distributed in a plurality of annular rows extending in the circumferential direction, the plurality of annular rows being spaced apart in the axial direction,
   wherein any pair of consecutive annular rows in the axial direction is such that the openings of one of the annular rows of the pair are centered relative to the first grooves, while the openings of the other annular row of the pair are centered relative to the second grooves such that each opening of the one of the annular rows of the pair is circumferentially offset to two consecutive openings of the other annular row of the pair closest to the each opening, and
   wherein a minimum centerline distance between the openings is 1.6 mm.

2. The assembly according to claim 1, wherein all axial grooves have the same shape.

3. The assembly according to claim 1, wherein each of the axial grooves extends continuously opposite a plurality of openings respectively belonging to a plurality of non-consecutive annular rows.

4. The assembly according to claim 1, wherein a radial distance between a bottom of each of the axial grooves and the radially inner annular wall of the annular duct at the openings lies in a range of three to five times a radial depth of each of the axial grooves.

5. The assembly according to claim 1, wherein the depth of each of the axial grooves is substantially equal to the diameter of the openings.

6. A turbine for a turbine engine, comprising a rotor, in addition to an assembly according to claim 1, the casing of which surrounds the rotor of the turbine.

7. The turbine engine for an aircraft, comprising at least one turbine according to claim 6, in addition to means for supplying cooling air connected to said annular duct.

8. The assembly according to claim 1, wherein each opening of the one of the two annular rows of the pair is situated at a circumferential distance equal to half of a circumferential distance that separates the two consecutive openings of the other annular row of the pair closest to the each opening.

9. The assembly according to claim 1, wherein the depth of each of the axial grooves is equal to a diameter of the openings.

* * * * *